(12) United States Patent
Douglas et al.

(10) Patent No.: US 12,547,370 B2
(45) Date of Patent: Feb. 10, 2026

(54) COMMISSIONABLE SMART DEVICE FOR ELECTRONIC CONFERENCE

(71) Applicant: Lenovo (Singapore) Pte. Ltd., Singapore (SG)

(72) Inventors: David Douglas, Cary, NC (US); Philip J. Jakes, Durham, NC (US); Tin-Lup Wong, Chapel Hill, NC (US); Ken Seethaler, Raleigh, NC (US); Kazuo Fujii, Yokohama (JP); Koji Kawakita, Yokohama (JP); Kelly C. Sean, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 270 days.

(21) Appl. No.: 18/361,470

(22) Filed: Jul. 28, 2023

(65) Prior Publication Data

US 2025/0036351 A1    Jan. 30, 2025

(51) Int. Cl.
*H03G 3/00* (2006.01)
*G06F 3/16* (2006.01)
*G10L 25/78* (2013.01)
*H04R 3/00* (2006.01)

(52) U.S. Cl.
CPC .............. *G06F 3/165* (2013.01); *G10L 25/78* (2013.01); *H04R 3/00* (2013.01)

(58) Field of Classification Search
CPC ............ G06F 3/165; G10L 25/78; H04R 3/00
USPC ................................................. 381/105, 104
See application file for complete search history.

(56) References Cited

U.S. PATENT DOCUMENTS

| | | | |
|---|---|---|---|
| 2017/0180557 A1* | 6/2017 | Rose | H04M 3/428 |
| 2021/0014676 A1* | 1/2021 | Silverstein | H04W 4/029 |
| 2022/0174102 A1* | 6/2022 | Griffin | H04L 65/403 |

FOREIGN PATENT DOCUMENTS

CN    118679519 A  *  9/2024  ............. H04R 1/406

* cited by examiner

*Primary Examiner* — Ammar T Hamid
(74) *Attorney, Agent, or Firm* — Schwegman Lundberg & Woessner, P.A.

(57) ABSTRACT

A computer implemented method performed by a smart device includes receiving a meeting signal from a conference hub device in a meeting room indicative of an electronic conference, communicatively connecting with the conference hub in response to receiving the meeting signal, generating a communication tunnel to a smart device microphone, and accepting commands from the conference hub device to control the smart device microphone via the communication tunnel.

19 Claims, 3 Drawing Sheets

COMMISSIONABLE SMART DEVICE FOR ELECTRONIC CONFERENCE

BACKGROUND

Electronic conference calls may involve users in a conference room as well as electronically connected remote users. A conference hub device in the conference room may be used to obtain video and audio of users in the conference room and transmit the obtained video and audio to remote users. Some users in the conference room may be relatively far from one or more microphones or cameras of the hub device and audio such relatively far users generate may not be picked up well. Remote users may have difficulty understanding the users that are relatively far from hub device microphones, or even seeing such users leading to a poor conference experience.

SUMMARY

A computer implemented method performed by a smart device includes receiving a meeting signal from a conference hub device in a meeting room indicative of an electronic conference, communicatively connecting with the conference hub in response to receiving the meeting signal, generating a communication tunnel to a smart device microphone, and accepting commands from the conference hub device to control the smart device microphone via the communication tunnel.

In further examples, the communication tunnel also includes a smart device camera to allow the conference hub to control the smart device camera.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Electronic conference calls may include a meeting room with multiple local participants and utilize a conference hub that has one or more cameras, microphones, and speakers. The conference hub may be situated on a table, with participants dispersed above the meeting room. Audio and video captured by the conference hub may be transmitted to remote users. Some local participants may be situated a longer distance from the conference hub microphones. Remote participants may have difficulty understanding the local participants that are relatively far from hub device microphones, or seeing such local participants that are far from a camera of the hub, leading to a poor conference experience.

Figure 1:
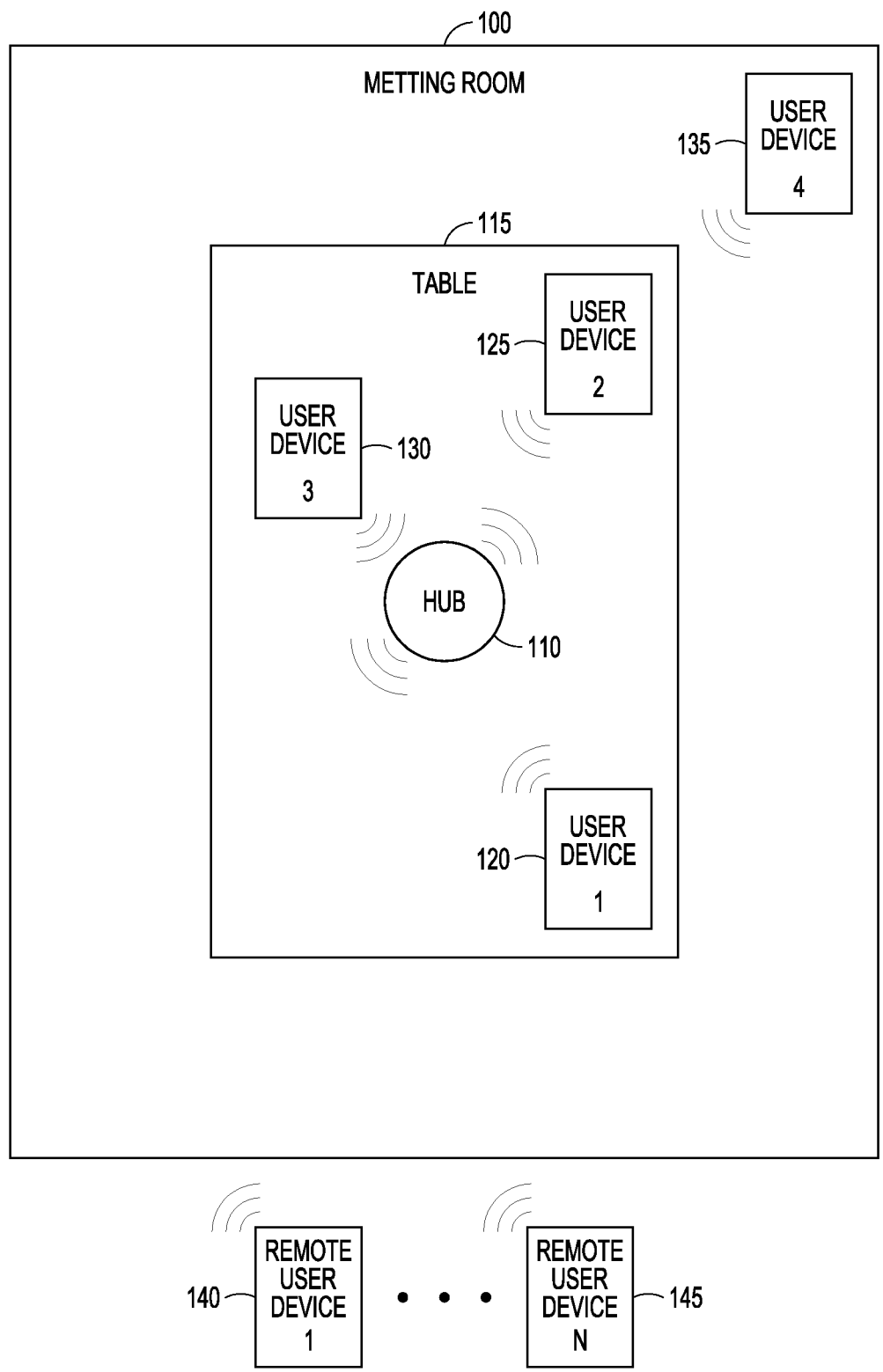
FIG. 1 is a block diagram illustrating meeting room having a conference hub and user devices according to an example embodiment.

FIG. 1 is a block diagram illustrating a meeting room 100 having a conference hub 110 supported on a conference table 115. The conference hub 110 includes one or more cameras, microphones, and speakers for facilitating a conference between multiple participants, both local, and remote by capturing sound and video, providing the sound and video to remote participants, receiving sound and video signals from remote participants, and providing the received sound and video from remote participants for listening and viewing by local participants. The conference hub 110 may be a Lenovo ThinkSmart® Hub in one example.

One or more of the local participants may have user devices, such as laptop computers, tablets, and smart phones. Four local user devices, user device 1 120, user device 2 125, user device 3 130, and user device 4 135 are shown as in the meeting room 100. Three of the user local devices are shown as on or near the table 115. User device 4 135 is shown remote from the table 115 and further from a microphone and camera in hub 110. The microphone in hub 110 may not receive audio from a user associated with user device 4 135 as well as sound from other users closer to the microphone in hub 110. Simlarly, hub cameras may not adequately capture view of such users that are further from the cameras.

One more remote user devices are shown and may also participate in a meeting. Remote user device 1 140 and remote user device N at 145 are shown. N may be any number greater than 1, but only as large as conferencing system and network constraints permit.

In one example, the hub 110 may broadcast a meeting signal 150 indicative of a meeting that is in progress or starting soon. The meeting signal 150 may be a local, short range wireless signal, such as a Bluetooth or Zigbee signal, or even a sound-based signal such as an ultrasound signal. The use of an ultrasound signal as the meeting signal 150 enables a limited ranges, such that only user devices within the room 100 may receive the meeting signal 150.

The meeting signal 150 may include encoded data, such as metadata identifying the availability of the meeting for connecting one or more of the local devices, such as by pairing with the local device. Local devices may proceed to pair with the local device and also create a communication tunnel, allowing the hub to directly receive audio from microphones and video from cameras in the paired device and to control the microphones, cameras, and even speakers via the connection and communication tunnel.

The communication tunnel may utilize the same communication protocol as the meeting signal, or may precipitate a handoff such that the communication tunnel uses a different wireless communication protocol, such as one that provides sufficient bandwidth for transferring data in association with an electronic meeting that may include video in addition to audio. In one example, an ultra-wideband (UWB) or WiFi communication protocol may be used for the communication tunnel.

Pairing with a local device may be dependent on the local device being an authorized device, such as a device that is known to the hub 110. Once paired a first time, the local device may be automatically paired for future meetings. The local device, on receiving the meeting signal, may initiate pairing, or may respond with a signal identifying the device and requesting to be paired for purposes of the meeting. Pairing may also be dependent on the user of the device having been invited to the meeting. The hub can either process the response to the meeting signal from the local device to determine whether or not to add the local device to the meeting and continue with pairing, or can process information in a request from the local device for pairing to determine whether or not to add the local device to the meeting.

In one example, once user device 4 135 is paired with the hub 110, and a communication tunnel has been established, the hub 110 can control the microphone of user device 4 135 to provide sound to the hub 110 which can be stitched or otherwise include in the audio stream provided to the remote user devices. The hub may also control the camera of the device 4 135 to provide video, which may automatically frame the user of the device and can be stitched with video of other participants in a gallery view for remote users to see. The communication tunnel in one example comprises a UWB or WiFi connection or other wireless connection that provides suitable data transfer rates.

Figure 2:
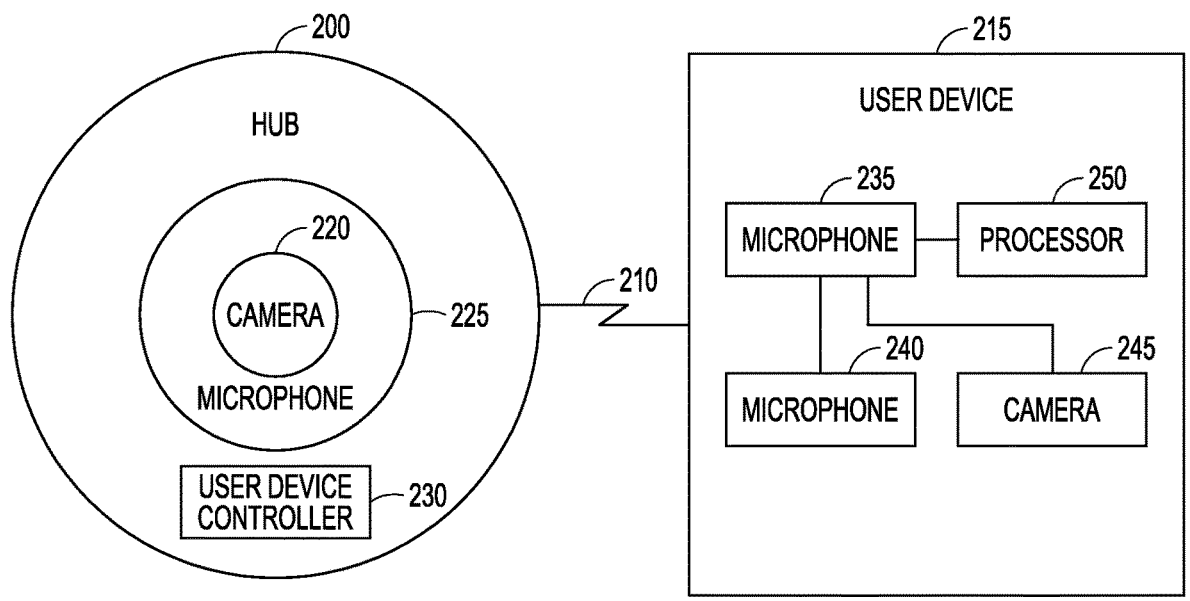
FIG. 2 is a block diagram illustrating a hub communicatively coupled via a connection to a user device according to an example embodiment.

FIG. 2 is a block diagram illustrating a hub 200 communicatively coupled via a connection 210 to a user device 215. Hub 200 includes a camera 220, microphone 225, and a user device controller 227. Hub 200 may also include processors, memory, communication card, speaker, and other components, not shown for ease of illustration. Camera 220 may be a 360 degree camera or cameral array, and microphone 225 may be an array of microphones.

Hub 200 may be capable of using angle of arrival of sound or from the array of microphones to identify participants speaking and control the microphone of a user device associated with the participant to capture the sound of the participant that is speaking. Alternatively, or in combination with angle of arrival, video processing may be performed to determine participants that are speaking. Such identification of who is speaking may be done by the hub 200 and used to mute or unmute the microphone of an associated user device to integrate the sound into a stream of information provided by the hub 200 to remote participant user devices to enable remote participants to more clearly hear user who may be remote from the hub microphone 225.

User device 215 may include a unified communication (UC) app 235, microphone 240, camera 245, and processor 250, as well as memory, communication card, speaker, and other components, not shown for ease of illustration. In one example, the app 235 may be a separate app dedicated to allowing commissioning of the user device 215.

In one example, connection 210 is a wireless connection between the hub 200 and user device 215 that may be established once the user device 215 is determined to be authorized to attend a meeting. The connection 210 is also representative of a communication tunnel extending into user device 215 to allow the hub 200 and user device controller 230 in particular to control one or more components or subsystems of user device 215, such as microphone 240 and camera 245. Such control may be referred to as commissioning of the user device 215 and treating user device 215 as an extension of the conferencing hub 200.

The use of Bi-directional ultrasonic meeting signals as the meeting signal to initiate commissioning of user devices may also be used to ensure the smart device's response to the hub 200 identifies the user device as a user device within a set of devices deemed acceptable or approved to be commissioned by the hub. Various methods may be used to ensure only authorized user devices are commissioned, such as a type of security ID. Meta data may be embedded in and deciphered from the ultrasound waveform corresponding to a defined security code or ID for example. Other signaling schemes like BTLE (Bluetooth low energy) may alternatively be used.

The user device controller 230 or other director software on the hub 200 may repackage audio or camera data to feed the UC app 235 in one example. The UC app 235 allows a simple one-touch opt-in messaging to the hub 200, opening the user device 215 to allow the hub 200 to tunnel in to control user device 215 subsystem components, such as microphone 240 and camera 245.

In one example, an auto framed video feed from the user device 215 is provided to the hub 200 to provide to remote attendees so that the remote attendees see local participants who are speaking as if the local participant was logged into the meeting with their camera on. Such local users, did not have to go through all the setup of actually finding the meeting and going through steps to join the meeting on their device, as they simply respond to a prompt on their device, such as with one click, to allow commissioning of their device by the hub in response to the meeting signal.

In further examples, a meeting host may be authorized to mute participant user devices that have been commissioned via the connection 210 and communication tunnel. The hub may also prioritize a whiteboard view over other video.

Figure 3:
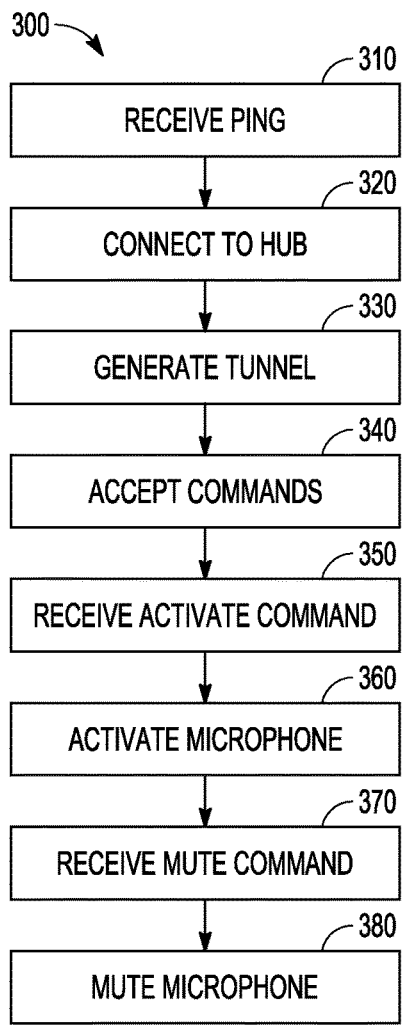
FIG. 3 is a flowchart of a computer implemented method performed by a smart device to allow commissioning of the smart device by a conference hub for a meeting according to an example embodiment.

FIG. 3 is a flowchart of a computer implemented method 300 performed by a smart device to allow commissioning of the smart device by a conference hub for a meeting. Method 300 begins at operation 310 by the smart device receiving a meeting signal from a conference hub device in a meeting room indicative of an electronic conference. In response to receiving the meeting signal, at operation 320, the smart device communicatively connects with the conference hub. Communicatively connecting may be performed by pairing with the conference hub using known protocols, such as Bluetooth or similar pairing protocols.

In one example, the meeting signal is a meeting signal that comprises a ultrasonic transmission from the conference hub. The meeting signal may include metadata identifying the electronic meeting. The smart device may respond to the meeting signal with information identifying the smart device as a trusted device prior to connecting and generating the communication tunnel to enable the conference hub to validate the smart device being on an electronic conference invite list.

Operation 330 generates a communication tunnel to a microphone of the smart device. The smart device may respond to the meeting signal with information prior to generating the communication tunnel to enable the conference hub to validate the smart device being on an electronic conference invite list. The communication tunnel enables control of a smart device speaker via the conference hub.

At operation 340, the smart device accepts commands from the conference hub device to control the smart device microphone and optionally the smart device camera via the communication tunnel.

In one example, method 300 continues by receiving a command at operation 350 to activate the smart device microphone via the communication tunnel. Operation 360 activates the smart device microphone in response to receiving the command to activate the smart device microphone. In one example, the command to activate the smart device microphone is received from the conference hub in response to detecting a user associated with the smart device is speaking. In further examples, the smart device camera may be controlled in the same manner.

Method 300 may continue at operation 370 by receiving a mute command from the hub via the communication tunnel. The microphone is muted at operation 380 in response to the mute command. The camera may also be turned off, or video therefrom simply not transmitted.

Figure 4:
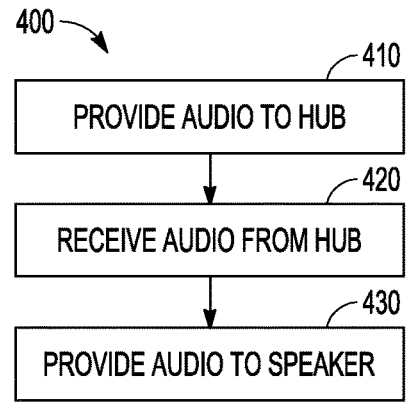
FIG. 4 is a flowchart illustrating a smart device implemented method of participating in the meeting as a hub commissioned device according to an example embodiment.

FIG. 4 is a flowchart illustrating a smart device implemented method 400 of participating in the meeting as a hub commissioned device. Method 400 begins after the smart device has been commissioned and the smart device microphone has been activated or unmuted by providing audio sensed by the smart device microphone to the conference hub via the communication tunnel at operation 410. At operation 420, audio from the conference hub representative of sound originating in the electronic conference is received by the smart device. The received audio is provided to a speaker of the smart device at operation 430.

Figure 5:
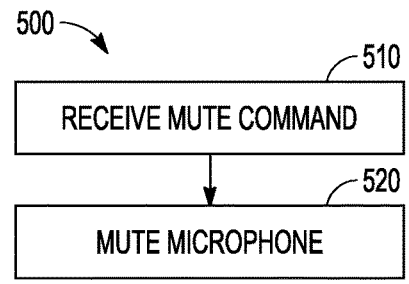
FIG. 5 is a flowchart illustrating a smart device implemented method of muting the microphone of the smart device according to an example embodiment.

FIG. 5 is a flowchart illustrating a smart device implemented method 500 of muting the microphone of the smart device. Method 500 beings at operation 510 by receiving a mute command via the communication tunnel. At operation 520, the smart device microphone is muted in response to the mute command. In one example, the mute command is received from the conference hub in response to either the smart device or the hub detecting a user associated with the smart device is not speaking.

Figure 6:
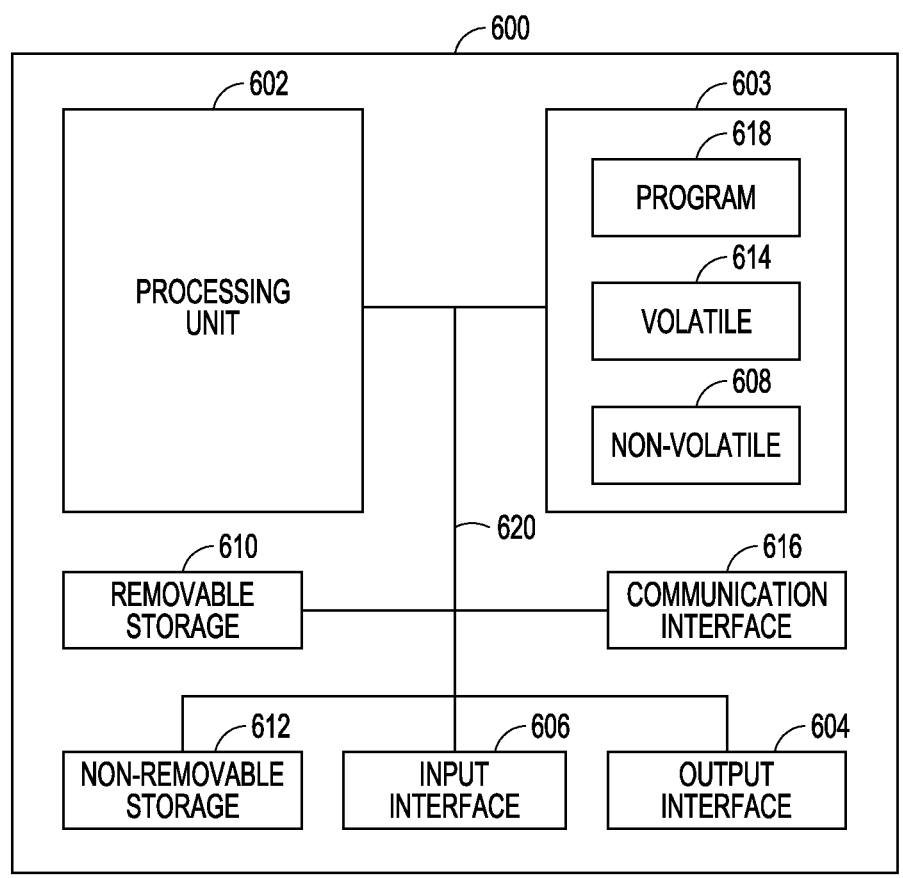
FIG. 6 is a block schematic diagram of a computer system to implement one or more example embodiments.

FIG. 6 is a block schematic diagram of a computer system 600 for implementing a hub or a smart device/user device and for executing code to implement one or more methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable-medium, machine-readable storage device, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

Examples

1. A computer implemented method performed by a smart device includes receiving a meeting signal from a conference hub device in a meeting room indicative of an electronic conference, communicatively connecting with the conference hub in response to receiving the meeting signal, generating a communication tunnel to a smart device microphone, and accepting commands from the conference hub device to control the smart device microphone via the communication tunnel.

2. The method of example 1 and further including receiving a command to activate the smart device microphone via the communication tunnel and activating the smart device microphone in response to receiving the command to activate the smart device microphone.

3. The method of example 2 wherein the command to activate the smart device microphone is received from the conference hub in response to detecting a user associated with the smart device is speaking.

4. The method of any of examples 2-3 and further including providing audio sensed by the smart device microphone to the conference hub via the communication tunnel.

5. The method of any of examples 1-4 and further including receiving audio from the conference hub representative of sound originating in the electronic conference and providing the received audio to a speaker.

6. The method of any of examples 1-5 and further including receiving a mute command via the communication tunnel and muting the microphone in response to the mute command.

7. The method of example 6 wherein the mute command is received from the conference hub in response to detecting a user associated with the smart device is not speaking.

8. The method of any of examples 1-7 wherein the meeting signal includes an ultrasonic transmission from the conference hub.

9. The method of any of examples 7-8 wherein the meeting signal includes metadata identifying the electronic meeting.

10. The method of example 9 wherein the smart device responds to the meeting signal with information identifying the smart device as a trusted device prior to connecting and generating the communication tunnel to enable the conference hub to validate the smart device being on an electronic conference invite list.

11. The method of any of examples 9-10 wherein the smart device responds to the meeting signal with information prior to generating the communication tunnel to enable the conference hub to validate the smart device being on an electronic conference invite list.

12. The method of any of examples 9-11 wherein the communication tunnel enables control of a smart device camera via the conference hub.

13. The method of any of examples 1-12 wherein communicatively connecting comprises pairing with the conference hub.

14. A machine-readable storage device has instructions for execution by a processor of a machine to cause the processor to perform operations to perform any of the methods of example 1-13.

15. A device includes a processor and a memory device coupled to the processor and having a program stored thereon for execution by the processor to perform operations to perform any of the methods of example 1-13.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method performed by a smart device, the method comprising:
   receiving a meeting signal from a conference hub device in a meeting room indicative of an electronic conference;
   responding to the meeting signal with information identifying the smart device as a trusted device to enable the conference hub device to validate the smart device being on an electronic conference invite list;
   communicatively connecting with the conference hub device in response to successful validation of the smart device;
   generating a communication tunnel to a smart device microphone; and
   accepting commands from the conference hub device to control the smart device microphone via the communication tunnel.

2. The method of claim 1 and further comprising:
   receiving a command to activate the smart device microphone via the communication tunnel; and
   activating the smart device microphone in response to receiving the command to activate the smart device microphone.

3. The method of claim 2 wherein the command to activate the smart device microphone is received from the conference hub device in response to detecting a user associated with the smart device is speaking.

4. The method of claim 2 and further comprising:
providing audio sensed by the smart device microphone to the conference hub device via the communication tunnel.

5. The method of claim 1 and further comprising:
receiving audio from the conference hub device representative of sound originating in the electronic conference; and
providing the received audio to a speaker.

6. The method of claim 1 and further comprising:
receiving a mute command via the communication tunnel; and
muting the microphone in response to the mute command.

7. The method of claim 6 wherein the mute command is received from the conference hub device in response to detecting a user associated with the smart device is not speaking.

8. The method of claim 1 wherein the meeting signal comprises an ultrasonic transmission from the conference hub device.

9. The method of claim 1 wherein the meeting signal includes metadata identifying the electronic meeting.

10. The method of claim 9 wherein the smart device responds to the meeting signal with information prior to generating the communication tunnel to enable the conference hub device to validate the smart device being on an electronic conference invite list.

11. The method of claim 9 wherein the communication tunnel enables control of a smart device camera via the conference hub device.

12. The method of claim 1 wherein communicatively connecting comprises pairing with the conference hub device.

13. A machine-readable storage device having instructions for execution by a processor of a machine to cause the processor to perform operations to perform a method, the operations comprising:
receiving a meeting signal at a smart device from a conference hub device in a meeting room indicative of an electronic conference;
responding to the meeting signal with information identifying the smart device as a trusted device to enable the conference hub device to validate the smart device being on an electronic conference invite list;
communicatively connecting with the conference hub device in response to successful validation of the smart device;
generating a communication tunnel to a smart device microphone; and
accepting commands from the conference hub device to control the smart device microphone via the communication tunnel.

14. The device of claim 13 wherein the operations further comprise:
receiving a command to activate the smart device microphone via the communication tunnel; and
activating the smart device microphone in response to receiving the command to activate the smart device microphone.

15. The device of claim 14 wherein the command to activate the smart device microphone is received from the conference hub device in response to detecting a user associated with the smart device is speaking.

16. The device of claim 14 wherein the operations further comprise:
providing audio sensed by the smart device microphone to the conference hub device via the communication tunnel.

17. The device of claim 13 wherein the operations further comprise:
receiving audio from the conference hub device representative of sound originating in the electronic conference;
providing the received audio to a speaker;
receiving a mute command via the communication tunnel; and
muting the microphone in response to the mute command.

18. A device comprising:
a processor; and
a memory device coupled to the processor and having a program stored thereon for execution by the processor to perform operations comprising:
receiving a meeting signal at a smart device from a conference hub device in a meeting room indicative of an electronic conference;
responding to the meeting signal with information identifying the smart device as a trusted device to enable the conference hub device to validate the smart device being on an electronic conference invite list;
communicatively connecting with the conference hub device in response to successful validation of the smart device;
generating a communication tunnel to a smart device microphone; and
accepting commands from the conference hub device to control the smart device microphone via the communication tunnel.

19. The device of claim 18 wherein the operations further comprise:
receiving a command to activate the smart device microphone via the communication tunnel; and
activating the smart device microphone in response to receiving the command to activate the smart device microphone.

* * * * *